(12) United States Patent
Delran

(10) Patent No.: US 11,044,850 B2
(45) Date of Patent: Jun. 29, 2021

(54) FRUIT COLLECTOR FEATURING SCALES WITH LIMITED DISPLACEMENT AND SCALE INTENDED FOR SUCH A COLLECTOR

(71) Applicant: PELLENC, Pertuis (FR)

(72) Inventor: Robert Delran, Pertuis (FR)

(*) Notice: Subject to any disclaimer, the term of this patent is extended or adjusted under 35 U.S.C. 154(b) by 248 days.

(21) Appl. No.: 16/204,009

(22) Filed: Nov. 29, 2018

(65) Prior Publication Data
US 2019/0208706 A1 Jul. 11, 2019

(30) Foreign Application Priority Data

Jan. 11, 2018 (FR) ..................... 18/70020

(51) Int. Cl.
*A01D 46/26* (2006.01)
*A01D 46/28* (2006.01)

(52) U.S. Cl.
CPC ........... *A01D 46/264* (2013.01); *A01D 46/28* (2013.01); *A01D 2046/262* (2013.01)

(58) Field of Classification Search
CPC ...... A01D 46/28; A01D 46/26; A01D 46/264; A01D 2046/262
USPC ....................... 56/328.1, 329, 330
See application file for complete search history.

(56) References Cited

U.S. PATENT DOCUMENTS

| | | | |
|---|---|---|---|
| 4,130,982 A | 12/1978 | Clary | |
| 4,150,526 A * | 4/1979 | Burton | A01D 46/28 56/329 |
| 5,341,630 A * | 8/1994 | Littau | A01D 46/28 56/330 |
| 7,703,269 B2 * | 4/2010 | McKibben | A01D 46/28 56/329 |
| 8,117,814 B2 * | 2/2012 | Sidhu | A01D 46/28 56/329 |

(Continued)

FOREIGN PATENT DOCUMENTS

| | | |
|---|---|---|
| EP | 2462796 A1 | 6/2012 |
| FR | 2351581 A1 | 12/1977 |
| FR | 2983677 A1 | 6/2013 |

OTHER PUBLICATIONS

Preliminary Search Report relative to French Priority Application, dated Aug. 22, 2018.

*Primary Examiner* — Thomas B Will
*Assistant Examiner* — Joan D Misa
(74) *Attorney, Agent, or Firm* — Egbert Law Offices, PLLC

(57) ABSTRACT

A scale and a fruit collector with connected rows of scales is provided. The rows of scales extending between an intake and an outlet of the collector parallel to a median axis of the collector, scales including respectively a succession of scales with overlap, mounted as pivots on a support with a return to a resting position, each scale presenting a longitudinal median scale axis extending from the proximal to distal end of the scale and forming, in the resting position, an acute angle of aperture with the median axis, relative to the collector intake, and in which each scale presents a capability to pivot relative to the support, between the resting position and at least one bent-back position towards the outlet of the collector, reducing the angle of aperture. At least one hindrance limits an amplitude of divergent displacement, respectively between two successive scales of a row of scales.

15 Claims, 9 Drawing Sheets

(56) References Cited

U.S. PATENT DOCUMENTS

2008/0307764 A1* 12/2008 Johnson ................ A01D 46/28
 56/329
2017/0231159 A1 8/2017 Williamson

* cited by examiner

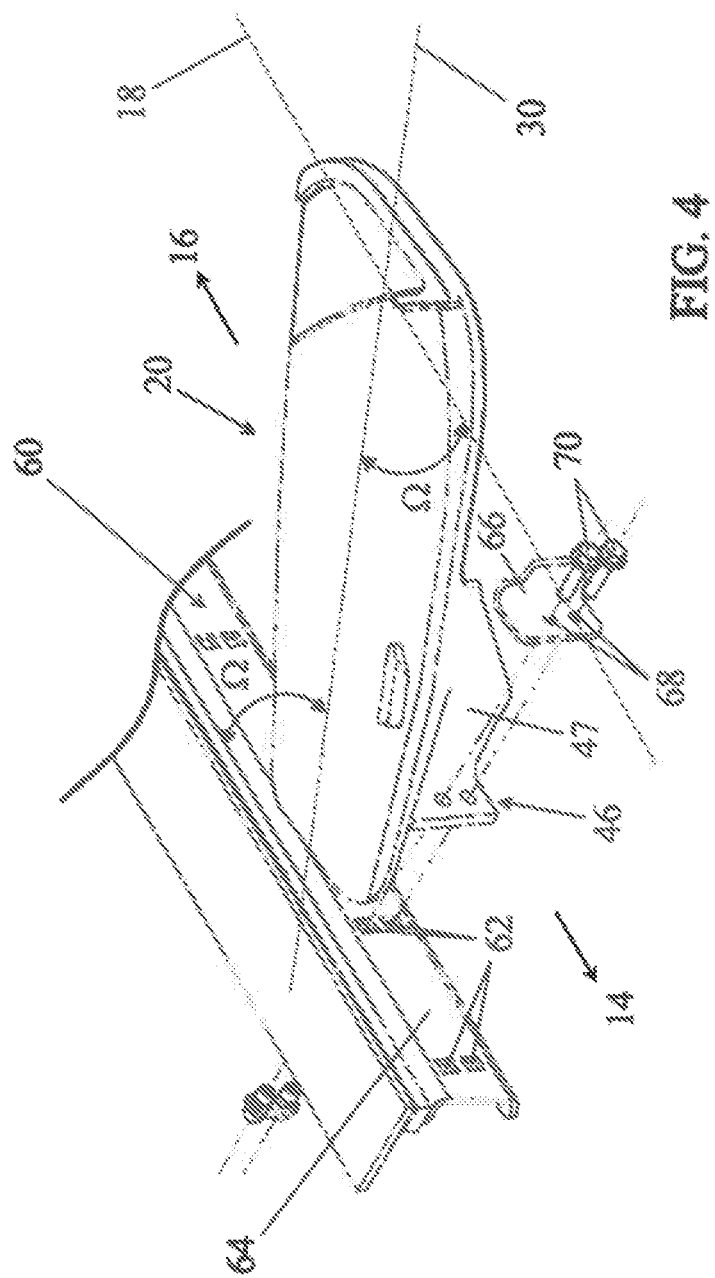

FRUIT COLLECTOR FEATURING SCALES WITH LIMITED DISPLACEMENT AND SCALE INTENDED FOR SUCH A COLLECTOR

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention concerns a fruit collector provided with scales, a scale intended for such a collector, and a harvesting machine equipped with such a collector.

The invention finds applications in harvesting machines for small fruit on trees or bushes or vines planted in a row pattern. The harvest involves small fruit such as olives, nuts, almonds, plums, Mirabelle plums or even grape berries.

One particular application of the invention concerns the wine industry where the fruit collector may equip a harvesting machine.

2. Description of Related Art Including Information Disclosed Under 37 CFR 1.97 and 37 CFR 1.98

A collector with scales is known, for example, from documents EP2462 796 or FR235181. The collector described in these documents includes two rows of scales, the rows of scales extending between an intake of the collector and an outlet of the collector in parallel to a median axis of the collector.

Each row of scales including a succession of scales with partial overlapping, mounted on a support so they can swivel towards the outlet of the collector during a contact with an obstacle such as a vine stock or a tree trunk passing through the scale collector, with a return to a resting position. The overlap of the scales serves to form a collecting space suitable for gathering fruits or berries detached from plantings having passed through a harvesting machine provided with the collector.

The scales can pivot, relative to the support, between the resting position and at least one position bent backwards towards the outlet of the collector.

To gather the fruits the scale collector is moved along a row of plantings at the height of the stem or the trunks of the plantings, below the fruit-bearing area. During this move the two rows of scales are able to pass around the trunks, and more precisely on both sides of the trunks in a row.

The trunk of each planting around which the fruit collector is engaged comes successively into contact with the different scales of each row of scales. Its effect during the contact is to successively push back the scales by making them pivot. The pivot of the scales has the effect of creating a passage for the trunk, but remains limited to the diameter of the trunk. By following the travel of the scale collector along the row of plantings and when the trunk is no longer in contact with a scale, the scale returns to its resting position under the effect of a return force and thus closes again the collecting space behind the trunk.

The collecting space thus remains closed around the trunks of the different plantings in a row of plantings the collector traveled through. By shaking the plantings, the fruits, berries or drupes fall on the collecting space formed by the scales. They are then gathered by lateral conveyors extending laterally along the rows of scales. The fruits may tumble towards the conveyors under the effect of an incline of the scales relative to the horizontal.

BRIEF SUMMARY OF THE INVENTION

The invention proceeds from the observation that a certain number of fruits unexpectedly traverse the collecting space formed by the scales of the fruit collector despite the overlapping of the scales.

It has been observed more precisely that an opening of the collecting space can occur during a brief moment when a scale has just left the trunk which was pushing it into a bent-back position and while the next scale of the row is still retained by the trunk.

This appearance of a gap is amplified when the return force exerted on the scales is significant. Under the effect of a sudden release of the scale when it leaves the trunk which was retaining it in its bent-back position, and under the effect of a significant return torque, the scale tends not only to return to its resting position but even temporarily to overshoot this resting position.

The fact of passing beyond the angular resting position temporarily accentuates a divergent displacement of the scale relative to the immediately following scale in the direction of the outlet of the collector and increases the size of the gap left behind the trunk.

The fruits that happen to be on the scale during its pivot towards the resting position, radially accelerated under the effect of the pivot, are thus unexpectedly able to traverse the gap in the overlap of the scales behind the trunk and to escape from the collector.

Incidentally, this sudden release of the scale and consequently its return to a significant angular area, exceeding the angular area formed between the resting position and its extreme bent-back position during its contact with the trunk, rapidly wears out the joint. The useful life of the scale is thereby reduced because of the possible exceeding of its elastic limit but also by fatigue over a number of repeated pivoting cycles followed by an abrupt return to the resting position.

The invention aims to overcome these difficulties and to reduce or even eliminate any gap in the overlapping of the scales susceptible of letting fruits slip by, while at the same time significantly increasing its useful life.

In order to achieve this goal, the invention proposes a fruit collector with connected rows of scales, the rows of scales extending respectively between a collector intake and a collector outlet parallel to a median collector axis, and the rows of scales including respectively a succession of overlapping scales mounted in pivoting fashion on a support, with a return to a resting position, in which:

each scale presents a proximal end turned towards the support and a free distal end opposite to the proximal end, a front edge turned towards the intake of the collector, and a rear edge turned towards the outlet of the collector, the front edge and the rear edge extending respectively between the proximal end and the distal end of the scale, each scale presents a longitudinal median scale axis extending from the proximal end to the distal end and forming, in the resting position of the scale, an acute aperture angle with the median axis of the collector, relative to the collector intake, and each scale presents a range of pivot relative to the support, between the resting position and at least one bent-back position towards the collector outlet, reducing the aperture angle.

According to the invention, the collector is provided with at least one limiting hindrance of a diverging deflection, respectively between two successive scales of one row of scales during a pivoting movement of a scale between the bent-back position and the resting position.

By bent-back position is meant a position reached following a scale pivot essentially in the collecting plane defined by the rows of scales towards the collector outlet. This means in particular a deflected position the scale can assume when it is pushed back on contact with the stem or trunk of a plant. In its pivoting movement it presents a minimal angle of aperture during its bent-back position, this minimal angle of aperture depends on the diameter of the trunk or stem in contact with the scale.

More precisely, a limiting hindrance of the divergent deflection can be provided between each scale of a row and the following scale of the row in the direction of the collector outlet, with the exception however of the last scale which is not followed by another scale.

It is understood that the limiting hindrances of deflection amplitude may be provided on only one row of scales, but preferably on the two connected rows of scales of the collector.

By the overlapping of the scales is meant a partial overlap of the scales. It may in particular mean a partial overlap between the rear part of one scale and the front part of the following scale so that there will be no gaps on a scale deck formed by the scales in resting position.

A partial overlap of the scales may be provided at the same time between each scale and the following scale in the same row of scales, the scales being in resting position, but also between adjacent scales of the two rows of scales. In particular the free distal ends of the scales of one of the collector scale rows may overlap the free distal ends of the scales of the connected scale row. The overlap may be obtained, for example by tilting at least one of the scale rows so that the free distal ends are not coplanar.

An angle of aperture of the scales is defined as between the median axis of the collector which goes from the intake to the outlet of the collector and a median axis of each scale between its proximal end and its distal end.

The angle of aperture which is essentially identical for all the scales of the collector in their resting position is an acute angle relative to the intake of the collector. An angle of aperture less than the right angle facilitates the gliding contact of the front edge of the scales on the trunks of the plantings that passed through the collector and a progressive pivoting of the scales to create an opening for the trunk to pass through.

When the front edge of the scales comes into contact with a trunk the scale is pushed back and in particular its free distal end pivots towards the outlet of the collector. The pivot temporarily reduces the angle of aperture.

Independently from the angle of aperture the scales may present a slight tilt of their free distal end towards their proximal end thereby making the fruits roll towards collectors likely to be positioned on both sides of the collector in the vicinity of the proximal ends of the scales.

The main function of the hindrance is to limit a divergent deflection between two successive scales in their respective pivot relative to the support. The hindrance does not prevent the pivot of the scales towards their bent-back position but limits the maximum value of an angle a scale can have with the following scale in the course of the pivot during the return to the resting position, especially when the upstream scale is no longer in contact with the trunk passing through the collection area. This angle can be measured for example between the front edges of the scales or between the median axes of the scales.

By limiting the deflection, it is possible to reduce or eliminate a gap that might develop between the consecutive scales. In effect, when a scale is released from its contact with a trunk, its return movement towards the resting position is limited by that of the following scale by means of the hindrance. The speed of the return movement of the scale released to its resting position is also reduced, its speed being limited at the release of the contact with the trunk by the acceleration of the scale towards an intermediate position prior to its resting position and thus in a reduced angular area. The hindrance is in particular capable of preventing the scale just released from a trunk from freely returning to its resting position in an abrupt manner and/or temporarily overshooting this position. In this manner the return of the released scale to its resting position depends on the return of the following scale to its resting position.

Implementation of the hindrance can take several forms. One very simple way consists of providing between each scale and the following scale a flexible link of fixed length, for example a string or small chain. The flexible link of fixed length is normally slack in the resting position of the scales or in a bent-back position at the passage of a trunk, but which is taut when an angle of deflection reaches its expected maximum value.

According to a preferred implementation of the invention the hindrance may feature a pair of conjugated stops complementary in shape, are solidly connected, respectively with two successive scales.

The conjugated stops are part of two different scales, but which are adjacent to each other in the row of scales. They are considered to be connected when they come into mutual interaction during a mutual, excessive, divergent deflection of the two scales.

The conjugated stops are considered to be of complementary shape when they interact with each other not through tangential friction but by coming into abutment one against the other.

Each scale may thus feature two stops which are not connected between them but which are connected respectively to the preceding scale and to the following scale of the row of scales.

In particular, each scale may feature a first stop positioned on an upper fruit-collecting face of the scale, and a second stop positioned on a lower face of the scale opposite the upper face.

According to a particular mode of implementation of the stops, the first stop may feature a catch protruding from the upper face of the scale and the second stop may feature a flange of a depression emerging on the lower face of the scale, the depression exceeding the height of the catch during the pivot of the scales assembled on their support.

In this case the catch of one scale can move, with limited amplitude of deflection, within the depression of the preceding scale of the row of scales in the direction of the intake of the collector during a pivot of the preceding scale. It does not come into abutment for convergent displacements of successive scales, i.e. of displacements that tend to increase the mutual overlap of the scales relative to their overlap in the resting position. But instead, for divergent displacements of the scales, i.e. displacements that tend to reduce the overlap of the scales, to resume their overlap in resting position or which would result in an absence of overlap, the catch of a scale abuts the second stop of the preceding scale, in the direction of the intake of the collector. It thus triggers the pivot of the preceding scale during the return of the preceding scale to its resting position while maintaining an overlap between the two scales. The convergent or divergent deflection between the scales is understood to be a measured deflection between the median axes of the successive scales. In the resting position of the successive scales their median axes are essentially parallel to each other.

It should be pointed out that this mode of implementation is particularly advantageous. As a matter of fact, the depression made on the lower face of the scales also allows reducing the mass of the scale as well as mutual friction between consecutive scales, due to their overlap and the weight of the fruits collected.

According to another mode of implementation which is not exclusive of the preceding, the first stop and the second stop may each feature catches.

The operation is identical to the one described above, knowing that the divergent deflection is limited when the catches forming the connected stops come into abutment.

The position of the stops is preferably the same for all scales of the collector, with the exception of the end scales which may have a different configuration, for example.

The stops, and in particular the catches may be positioned in a zone of the scale extending between a fastening tab of the scale and a line, perpendicular to the median axis of the scale, and situated in the plane of the scale halfway between the proximal end and the distal end of the scale.

The stops are thus located at a distance from the free distal ends of the scales and do not interfere with collecting the fruits.

The positioning of the stops on each scale allows adjusting the amplitude of the permitted divergent deflection.

The amplitude of divergent deflection of the successive scales may be chosen to be preferably less than or equal to an angle of 30 degrees. This amplitude of divergent deflection allows limiting the size of the gap between the trunk and the deck of the scale when the scale loses contact with the trunk, and maintaining an overlap between the two scales. In this way it [=the scale] returns quickly from an intermediary position to the resting position while at the same time the following scale is in contact with the trunk. It thus covers the gap created after the passage of the trunk by avoiding any gap between the rear edge of the scale and the front edge of the following scale, end thus maintaining an overlap between the two scales.

The stops may be positioned, for example, on both sides of a plane, perpendicular to the upper face of the scale and passing through the median axis of the scale.

In particular, the first stop may be positioned in proximity of the front edge of the scale whereas the second stop may be positioned in proximity of the rear edge of the scale.

Preferably, the stops may be placed so that two connected stops of two successive scales abut each other when the two scales are in their resting position.

As mentioned earlier, the scales present two by two an overlap, i.e. a partial covering, so as to ensure the deck is tight with respect to the fruits that have been collected. Preferably, this may be a covering between a front edge of one scale and the rear edge of a following scale in the direction of the outlet of the collector, the front edge passing under the rear edge.

Overlapping may also be provided between the free ends of the scales of the connected rows of scales. This is an overlap that is localized along a median line of the collector extending from the intake of the collector to the outlet of the collector.

According to a particular implementation of the scales, at least one of the front edge of the scales and an edge of the distal end of the scales may present a fruit-retaining relief. This may be, for example, a rim or a peripheral lip. The retaining relief protrudes on the upper face of the scale, i.e. the face gathering the fruits, and thus prevents the picked fruits from leaving the scale or from being projected away from it, especially during the pivot of the scale. In the particular case of a collector to be used on a grape picking machine the rim also serves to contain and retain any juice flowing from the harvested grape berries.

The invention also concerns a scale, and in particular a scale intended for a fruit collector as described.

The scale presents:
a proximal end,
a distal end,
a front edge linking the proximal end to the distal end,
a rear edge, opposite the front edge and linking the proximal end to the distal end, and
In accordance with the invention,
a first stop placed on an upper fruit collecting face of the scale in the vicinity of the front edge, and
a second stop placed on a lower face of the scale, opposite the upper face, in the vicinity of the rear edge.

The first and the second stop may be configured in the manner already described, and in particular in the form of catches.

Furthermore, and as mentioned previously, at least one of the front edge and/or an edge of the distal end of the scale may present(s) a fruit-retaining relief distinct from the first stop.

The scale when it is mounted on a support of the collector may be associated with a return spring to bring the scale back to its resting position. However, and according to a preferred implementation of the scale, the scale may feature a tab for fastening the scale to the support of the collector, the tab consisting of an elastic material so as to constitute a return spring of the scale.

The fastening tab may serve as a spring either by inserting into it a spring blade or by being made of an elastic material.

The fastening tab may be attached to the scale by a screwed joint. However, it is preferred that the fastening tab may also be of one piece with the scale by injection. The tab and the scale are made, for example, of a material of the thermoplastic elastomer (TPE) type and preferably of the food grade quality.

The fastening tab may be located in the vicinity of the proximal end of the scale and may preferably be placed on the lower face, i.e. the face opposite the one receiving the fruits.

The invention concerns also a harvesting machine and in particular a grape picking machine including at least one fruit collector as described and a plant shaking device located above the collector.

The shaking device may be provided with a plurality of shaker arms which shake the plantings around which the collector is engaged as it is moved along a row of plantings. Shaking the plantings results in the fruits, drupes or berries to become detached from them and to be gathered on the deck constituted by the scales of the collector around their trunk.

The harvesting machine, equipped with wheels, may be of the self-propelled type or it may be a towed machine. It may include fruit conveyors placed along the collector to transport the harvested fruits towards containers or a sorting table.

Other characteristics and advantages of the invention will become clear from the following description, figures and drawings. This description is given for illustrative purposes and not limiting.

BRIEF DESCRIPTION OF THE SEVERAL VIEWS OF THE DRAWINGS

FIG. 4 is a perspective view of a scale and illustrates a detail of its fastening on a support of the collector.

FIGS. 5A to 10A are top views of a part of a row of scales of a collector according to the invention and illustrate their operation.

FIGS. 5B to 10B are top views of a part of a row of scales of a collector representing the state of the art and which does not show any hindrances in accordance with the invention and illustrate their operation. They are positioned opposite the FIGS. 5A to 10A so as to compare the behavior of the scales as a trunk passes through.

The figures are shown in free scale.

DETAILED DESCRIPTION OF THE INVENTION

In the following description identical, similar or equivalent parts of the different figures are designated with the same reference marks so they can be referred to from one figure to another.

Figure 1:
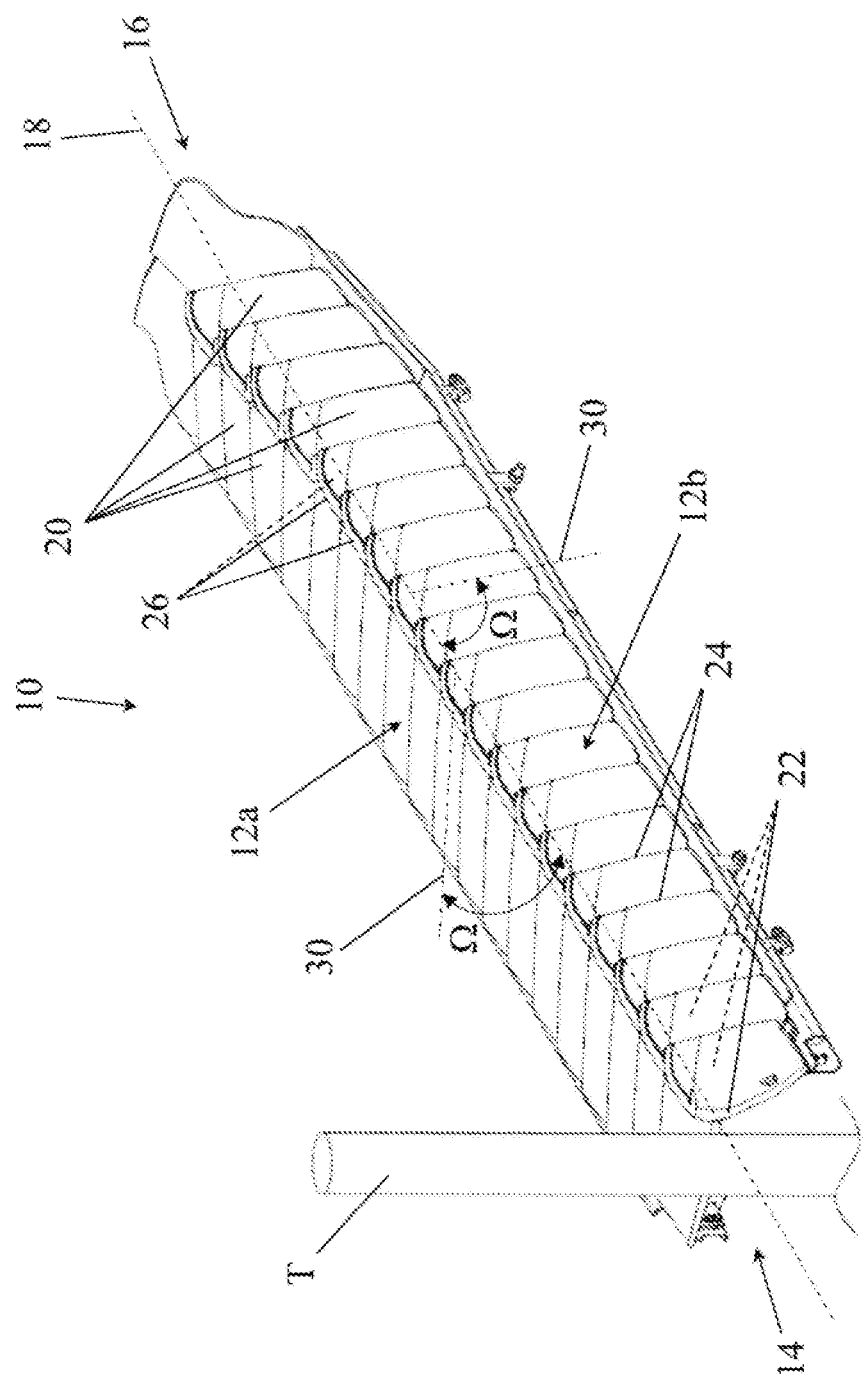
FIG. 1 is a simplified representation of a collector according to the invention.

FIG. 1 shows a collector 10 according to the invention. It essentially features two rows of scales 12a, 12b extending from an intake 14 of the collector to an outlet 16 of the collector parallel to a median axis 18 of the collector.

Each row of scales 12a, 12b comprises a succession of scales 20 between the intake 14 and the outlet 16 of the collector.

The scales 20 are of the overlapping type, i.e. with partial covering.

It can be seen that a front edge 22 of each scale 20 is covered by a rear edge 24 of the immediately preceding scale 24 in the corresponding row of scales 12a, 12b in the direction of the outlet 16 of the collector 10.

Overlapping exists also between the edges of the free distal ends 26 of the scales 20 of the two rows of scales 12a, 12b.

It can be seen that the edges of the free distal ends 26 of the scales 20 of one of the row of scales 12b all pass above the edges of the free distal ends of the adjacent scales of the other row of scales 12a.

FIG. 1 shows the scales 20 of the collector in a resting position. The scales 20 each present a median scale axis 30 which forms with the median collector axis 18 an acute angle of aperture S/viewed from the collector intake.

The angle of aperture formed at rest is essentially the same for each scale 20.

The acute angle translates the fact that the scales occupy a resting position in which their free distal end 26 is turned in the direction of the outlet 16 of the collector 10.

The fruit collector 10 is moved through a row of plantings by aligning as much as possible the median axis of the collector with this row. Thus the trunks T of the plantings pass through the collector 10 along its median axis 18 while successively forcing back the scales by contact with their frontal edge from the intake 14 of the collector to its outlet 16.

Under the effect of a trunk T the scales pivot by being further deflected to the rear. This temporarily reduces the acute angle each scale forms with the median axis while the trunk passes through.

Figure 2:
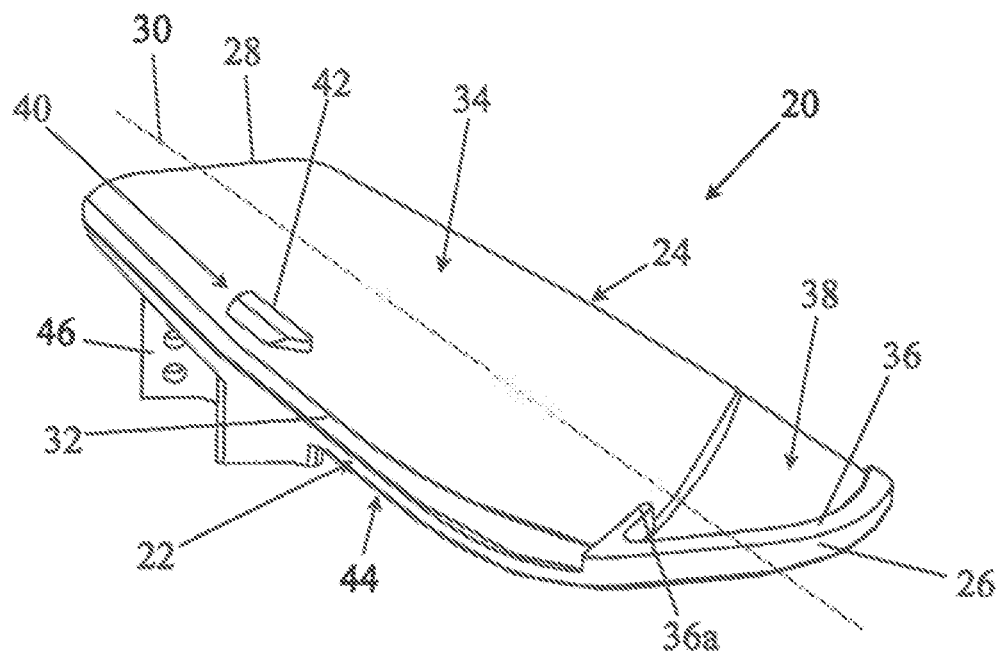
FIG. 2 is a perspective view of a scale according to the invention, intended for the collector and shows an upper face of the scale seen from its distal end.

FIG. 2 shows an individual scale 20 of the collector. The scale, and especially its upper face as visible in FIG. 2, extends essentially along a plane, called "the scale plane". The scale is produced by injection of a plastic material such as a food grade thermoplastic elastomer.

A median axis 30 of the scale extends, in the scale plane, between a proximal end 28 and a distal end 26.

On both sides of the median axis can be seen a front edge 22 of the scale 20 meant to be turned towards the intake of the collector, and a rear edge 24 meant to be turned towards the outlet of the collector.

The front edge 22 is provided on an upper face 34 of the scale with a fruit-retaining relief. This is a raised rim 32 which protrudes on the essentially plane upper face 34.

One edge of the distal end 26 of the scale which forms an angle with the front edge 22 includes also a rim 36 in the part which is not susceptible of being overlapped by another scale in a bank of scales. The rim 36 of the distal end is even higher than the rim 32 of the front edge. It also constitutes a fruit-retaining relief. The rim 36 of the distal end 26 presents a fold-back 36a towards the median axis 30 of the scale at a right angle to a slight depression 38 of the upper face 34. This depression is susceptible of collecting juice or a heap of fruits harvested in an area not swept by an overlap of the scales and which would be susceptible of crossing a gap between two scales during a rapid return of the scale towards its resting position.

On the upper face 34 in proximity of the front edge 22 a first stop 40 can be seen. The stop 40 presents itself in the form of a catch 42 which protrudes on the upper face 34 of the scale and which exceeds the height of the rim 32 of the front edge 22.

The first stop 40 is part of a limiting hindrance of deflection amplitude between scales when the scale is mounted on a collector.

In the vicinity of the first stop 40, and on a lower face 44 of the scale, there is a fastening tab 46 of the scale which is of one piece with the scale.

Figure 3:
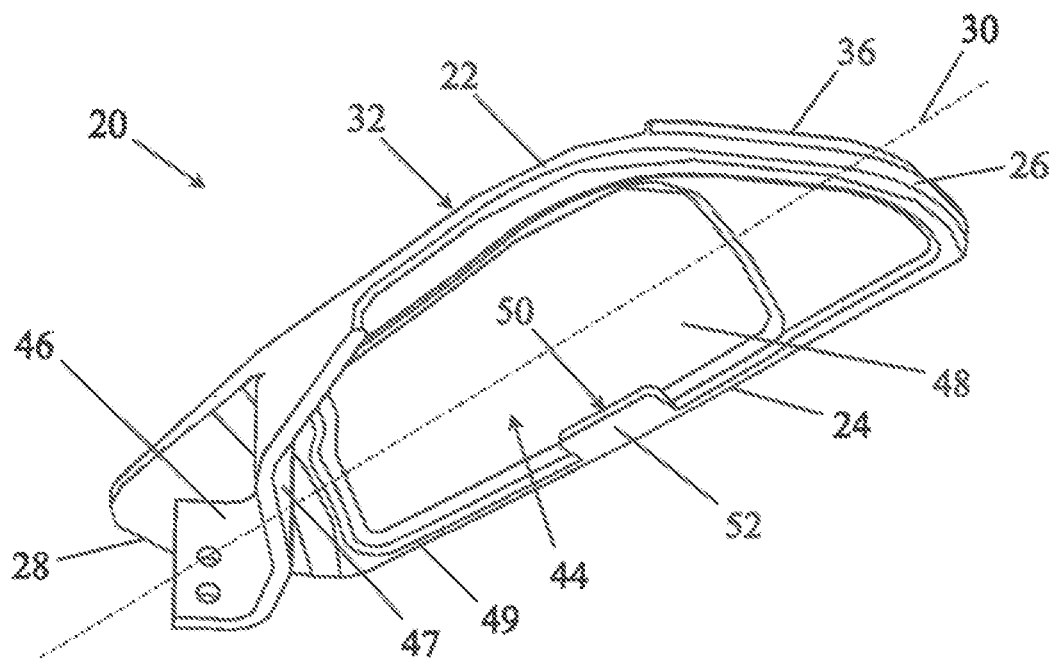
FIG. 3 is a perspective view of a scale according to the invention, intended for the collector and shows a lower face of the scale.

The lower face 44 of the scale is better visible on FIG. 3. It presents a depression 48 with a flat bottom delimited by a peripheral rim 49. In the particular example of FIG. 3 the peripheral rim 49 is provided with a catch 52 protruding on the rim in the direction of the median axis 30 of the scale. The catch 52 constitutes a second stop 50 which is also part of a hindrance of limiting deflection between scales.

In the absence of the catch 52 the edge 49 could also constitute a stop.

The fastening tab 46 of the scale is also better visible on FIG. 3. The fastening tab 46 presents itself in the form of a flexible arm 47 with one end being of one piece with the scale and a free end provided with fastening holes.

FIG. 4 shows the assembly of a scale 20 on the scale support 60 of which only a part is visible.

The scale support 60 presents itself in the form of a sectional rail with perforations 62 on a main face 64 for the purpose of fastening scales. The rail extends parallel to the median axis 18 of the collector. It can be seen that the median scale axis 30 forms with the scale support an angle Ω viewed from the outlet 16 of the collector, identical to the angle Ω it forms with the median collector axis 18, viewed from the intake 14 of the collector.

The free end of the fastening tab is placed against the main face 64 of the scale support by means of a fixing plate 66.

The fixing plate 66 presents drillings 68 fitted to the fastening holes of the fastening tab 46 of the scale and to the perforations 62 of the scale support 60 for fastening bolts 70 to pass through.

The figures described below illustrate the movement of the scales as a trunk T of a planting passes through. For the sake of simplification and for better readability of the figures only 5 successive scales of a single row of scales are shown. Incidentally, the FIGS. 5A, 6A, 7A, 8A, 9A and 10A illustrate the operation of scales according to the invention, whereas the FIGS. 5B, 6B, 7B, 8B, 9B, 10B illustrate an operation of the scales in the classic manner as per the state of the art without the characteristics of the invention. One should however keep in mind that the collector has two connected rows of scales, shown in FIG. 1. The following figures also do not feature all the hidden parts for reasons of simplification and visibility.

Figure 5A:
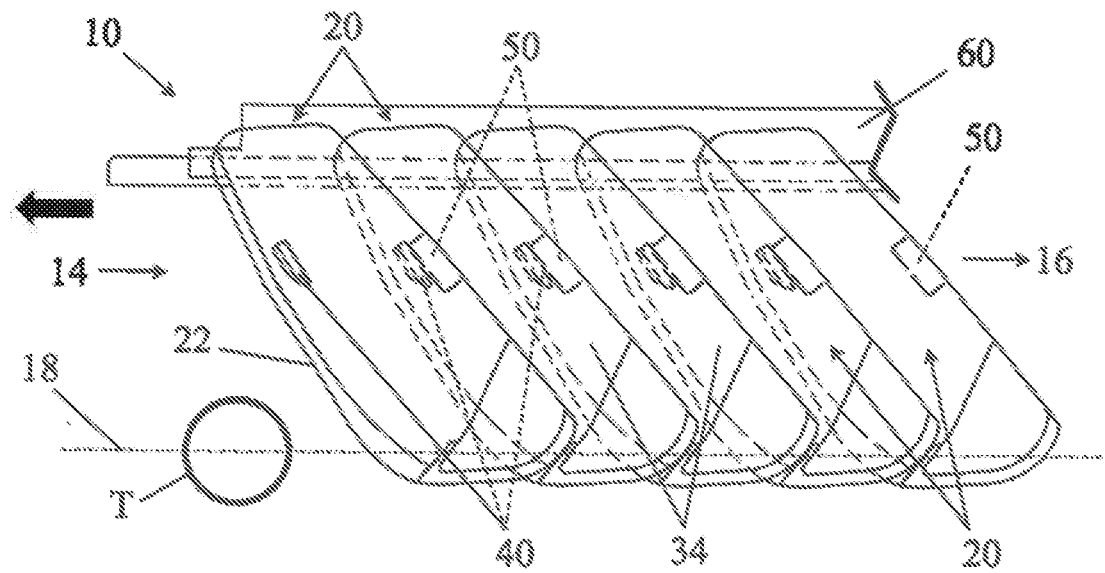

FIG. 5A shows the intake 14 of a collector 10 according to the invention at the approach of the trunk T of a planting essentially aligned on the median axis 18 of the collector. The collector is moved essentially along the median axis in the direction of the trunk and the frontal edge 22 of the first scale has not yet reached the trunk T. The direction of travel of the collector relative to the trunk is indicated by an arrow on FIG. 5A and the following corresponding figures.

All the scales 20 are in their resting position, slightly deflected towards the outlet 16 of the collector 10.

In the description that follows the terms 'first scale', 'second scale', 'following scale' and 'preceding scale' are understood to mean from the intake 14 of the collector towards the outlet 16 to the collector.

With the exception of the first scale, the first stops 40 of each scale extend in the depression of the lower face of the preceding scale. It can also be seen that the first stop 40 of each scale, with the exception of the first scale at the intake 14 of the collector is in abutment with the second stop 50 of the preceding scale in the direction of the intake 14 of the collector. The stops 40 and 50 and more precisely the catches which constitute them are represented in broken lines because they are concealed by the upper faces 34 of the scales.

The first stop 40 of a scale and the second stop 50 of the preceding scale constitute a hindrance to a divergent displacement of these two scales, as it appears on the following figures.

The fastening tabs are not shown here.

Figure 5B:
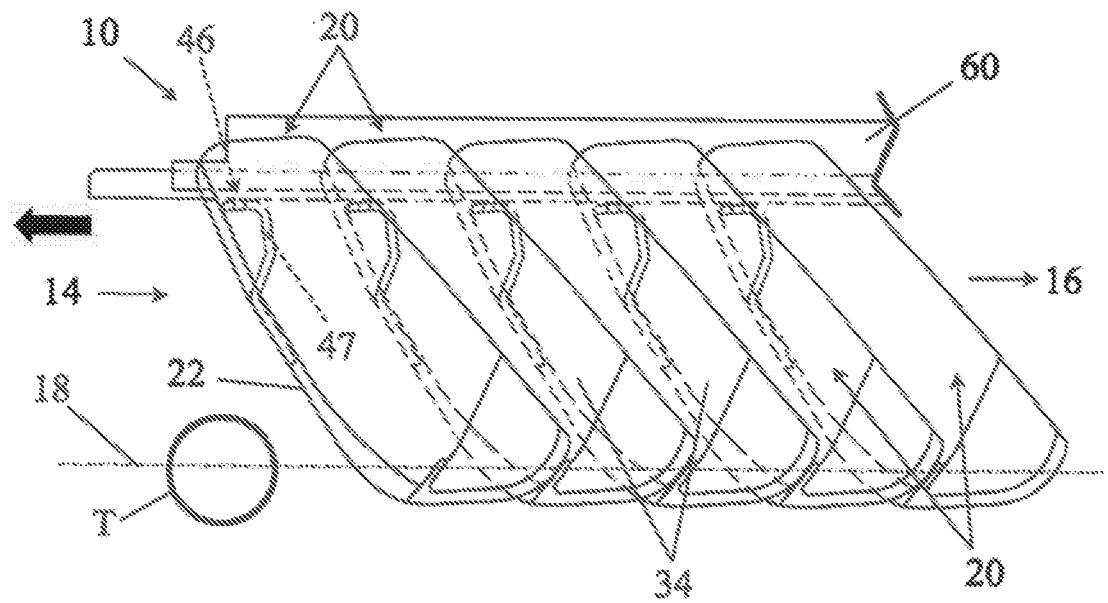

FIG. 5B shows a deck of scales similar to the one of FIG. 5A, but without stops. The scales occupy a comparable resting position in which the flexible are 47 of their fastening tab 46 does not exert any return force in a plane parallel to that of the main faces of the scales.

Figure 6A:
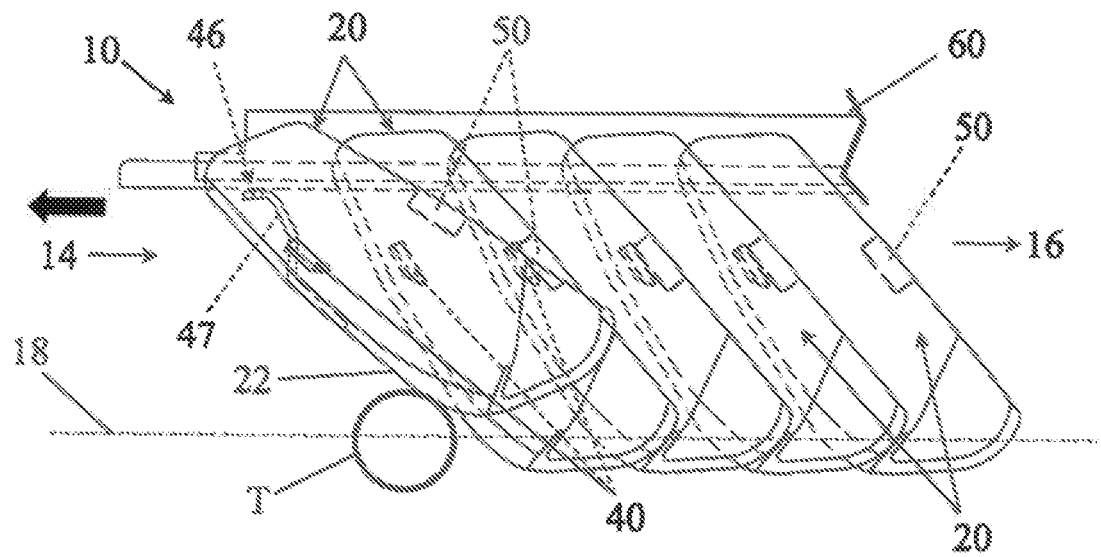

FIG. 6A shows a beginning of deflection of the first scale of the collector towards the outlet 16 of the collector. The deflection occurs essentially in the gathering plane defined by all the scales. It results from the displacement of the collector relative to the trunk T.

The deflection occurs because of an interaction between the front edge 22 of the first scale with the trunk T.

The second scale is still in its resting position. It can be seen that the second stop 50 of the first scale, i.e. the stop on the lower face of the first scale, gets separated from the first stop 40 of the second scale, i.e. the stop on the upper face of the second scale. In this movement, the first and second scales do converge. The stops do not have any hindering effect in this movement.

The stops of the following scales remain in abutment.

It can also be seen that the pivot of the first scale is accompanied by an elastic deformation of the arm 47 of the fastening tab 46. The fastening tabs are not shown on the following scales, in resting position, but their respective fastening tabs are similar to those shown in FIG. 6B.

Figure 6B:
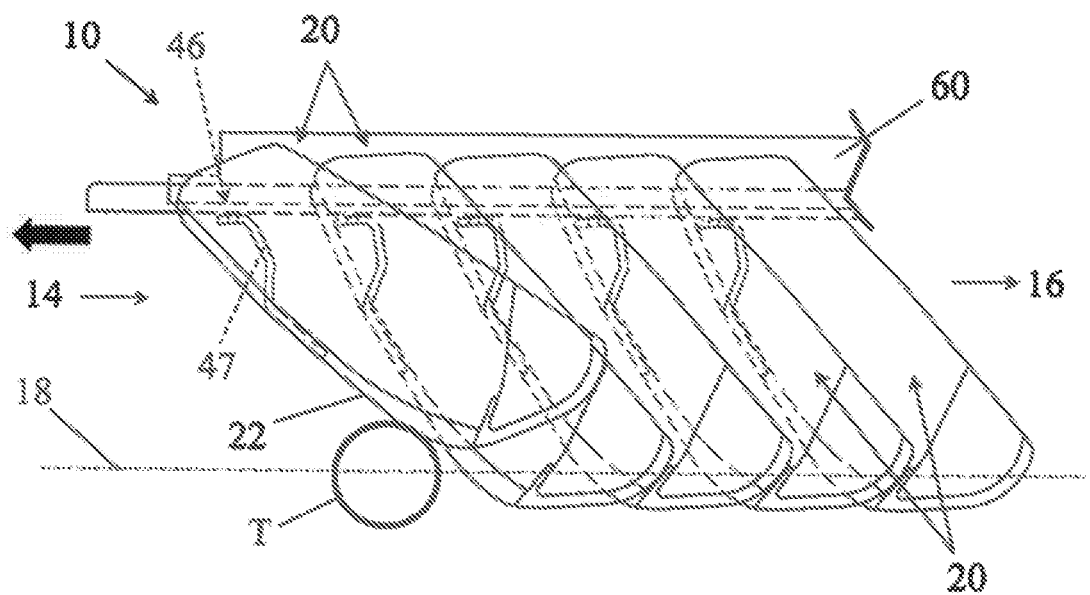

By comparison it is possible to see on this FIG. 6B that the movement would be the same for scales without stops.

Figure 7A:
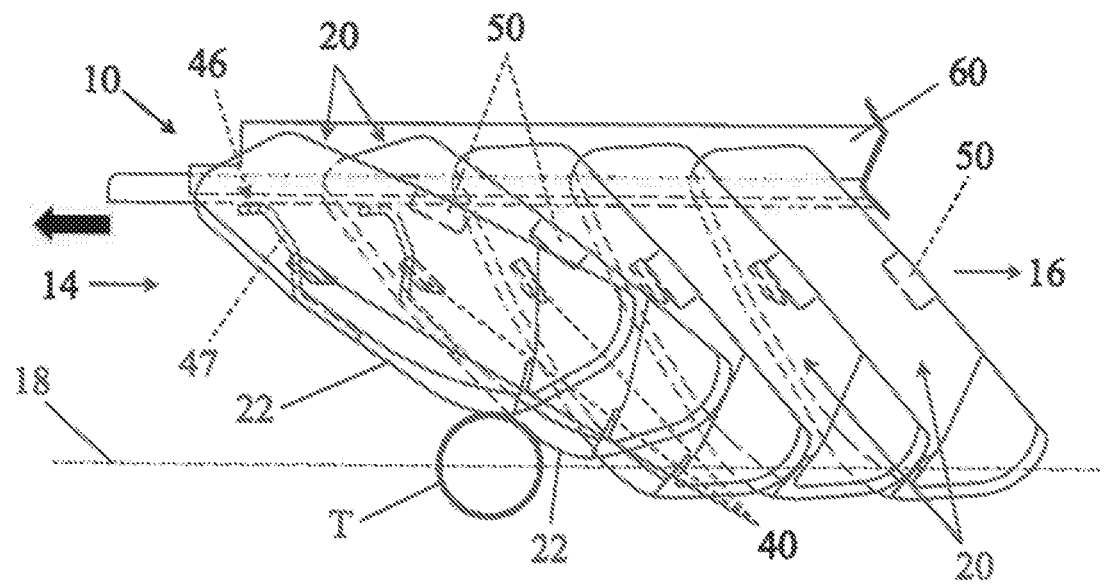

FIG. 7A illustrates the continuation of the forward movement of the collector 10 in relation to the trunk T. From this point on, the first two scales 20 are bent backwards, i.e. towards the outlet 16 of the collector 10. The first scale being more deflected than the second one.

The second stop 50 of the first and of the second scale are respectively detached from the first stops 40 of the second and of the third scale. The following stops are always in contact.

One can note on the first scale a stronger elastic deformation of the arm 47 of the fastening tab 46, thereby storing an energy that becomes more and more significant and which will be consumed at the return of the scale.

Figure 7B:
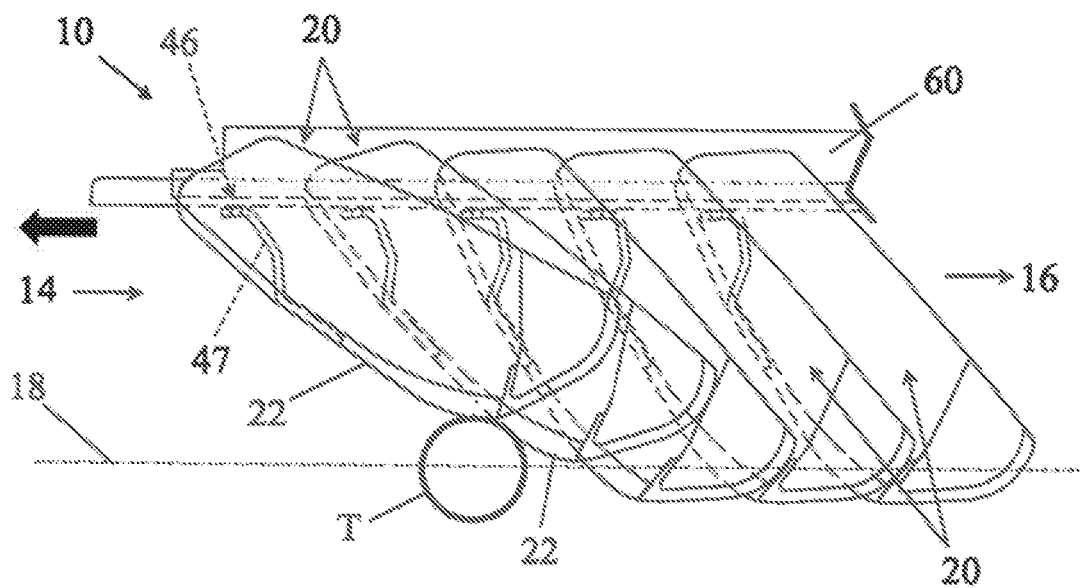

The movement of the scales of the collector of FIG. 7B that have no stops remains the same as that of FIG. 7A.

Figure 8A:
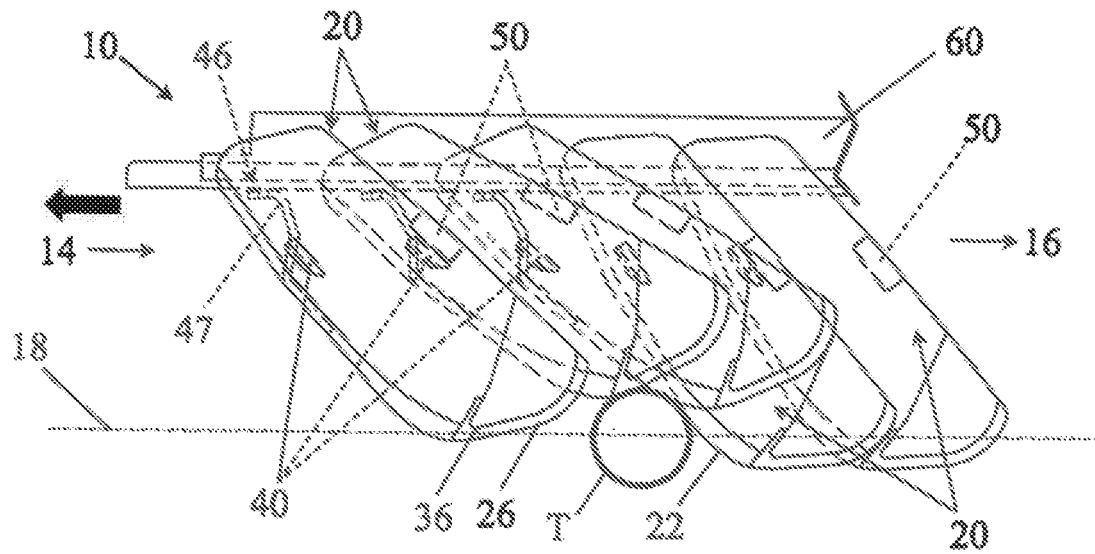

FIG. 8A shows the collector in a position relative to the trunk in which the second and the third scale are deflected towards the outlet 16 of the collector. The first scale is no longer in contact with the trunk T. The return force exerted by the elastic energy stored during the deformation of the arm 47 of the fastening tab 46 of the first scale makes it pivot towards its resting position as shown in FIG. 5A. One notices however that the rim 36 of the distal end 26 just barely begins to reach the median axis 18 of the collector and thus that the scale is an in intermediary position towards its resting position.

In the pivoting movement the second stop 50 of the first scale comes into contact with the first stop 40 of the second scale and prevents a complete return towards the resting scale of the first scale as long as the second scale is kept in contact against the trunk T. The stops play in this case a role of hindrance limiting the divergent displacement between the first and the second scale during a return of the first scale to its resting position. As it is being retained by the stops, the return of the first scale to its resting position progresses as the edge of the free distal end 26 of the second scale slides over the trunk T. The overlap of the two scales lasts through the entire phase of return to the resting position.

Figure 8B:
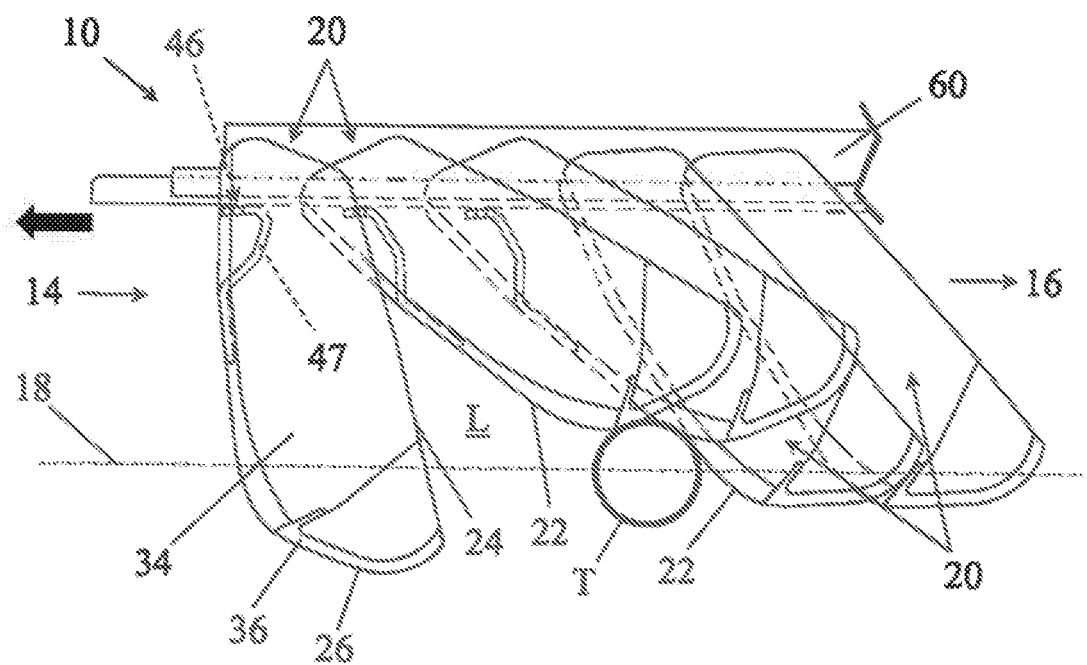

In contrast, it can be observed on FIG. 8B which corresponds to the collector without hindrance, that the energy stored in the fastening tab 46 during the contact of the scale with the trunk T brings it abruptly and instantly back into its resting position. During this movement the scale passes however temporarily through a position beyond its resting position such as shown in FIG. 5B, thereby creating a gap L. The gap L, temporary until the return of the scale to its resting position, finds itself on the side of the trunk T turned towards the intake 14 of the collector. It constitutes a significant opening of the gathering deck between the front edge 22 of the second scale and the rear edge 24 of the first scale. The overlap of the two scales is at this moment almost inexistent. The opening of the gathering deck is susceptible of causing a loss of fruit through this gap, and especially of fruits lying initially on the upper face 34 of the scale and unable to follow the sudden movement of the scale as it loses contact with the trunk.

Figure 9A:
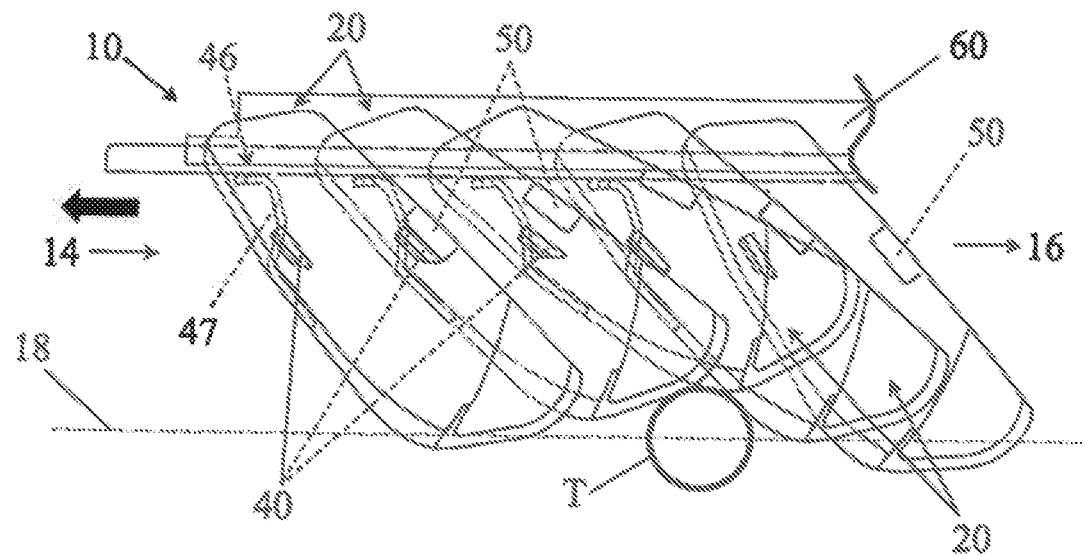

FIG. 9A shows a later stage of advancement of the collector 10 relative to the trunk in which the first scale has almost returned to its resting position but without having reached it completely and in which the second, the third and the fourth scale are interacting with the trunk. It can be observed that the deflection of the scales towards the outlet 16 of the collector is progressive. The return of the scales to their resting position is also progressive on account of the hindrance formed by the stops which prohibits an excessive divergent displacement at the return of the scales to the resting position. There is thus no gap created between a rear edge of a scale and the front edge of the following scale and the gathering deck remains very close to the trunk T.

Figure 9B:
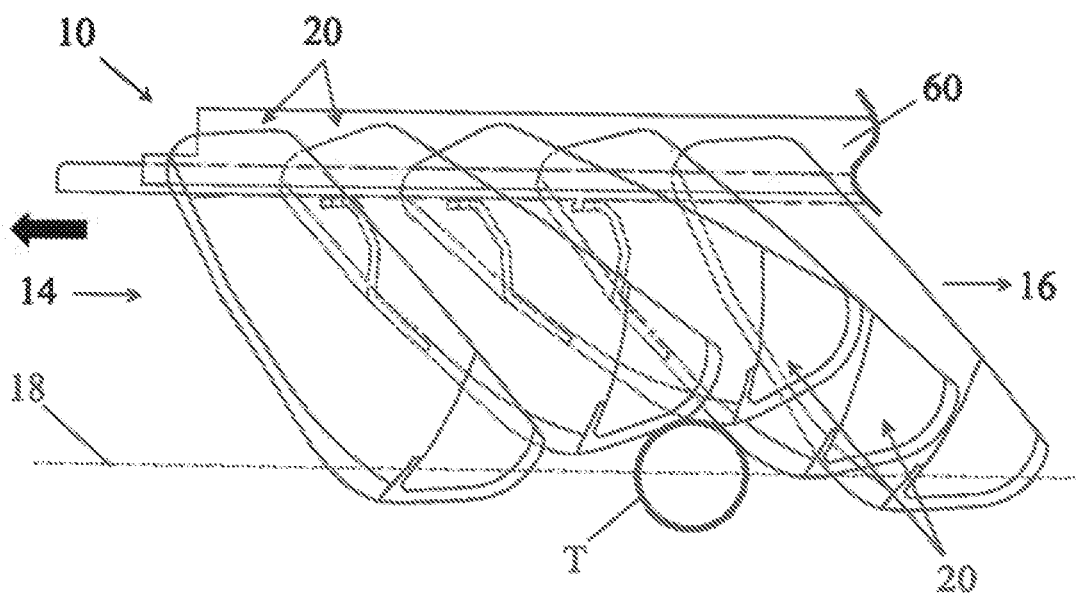

FIG. 9B shows the collector without stops. The first scale has returned to the resting position and the gap of FIG. 8B is virtually resorbed.

Figure 10A:
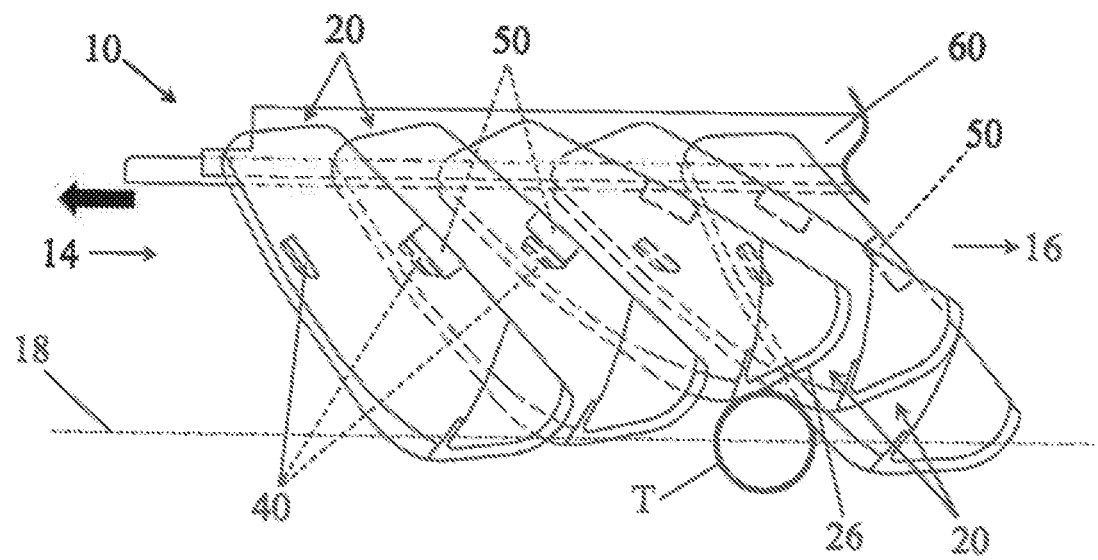

FIG. 10A illustrates the progressive return of the second scale towards its resting position. The second scale is retained by the first stop 40 of the third scale which abuts the second stop 50 of the second scale. The edge of the free distal end 26 of the third scale slides on the trunk and slows down the return of the second scale towards its resting position.

The first scale is in its resting position. Virtually no gap of the collecting space is formed around the trunk.

Figure 10B:
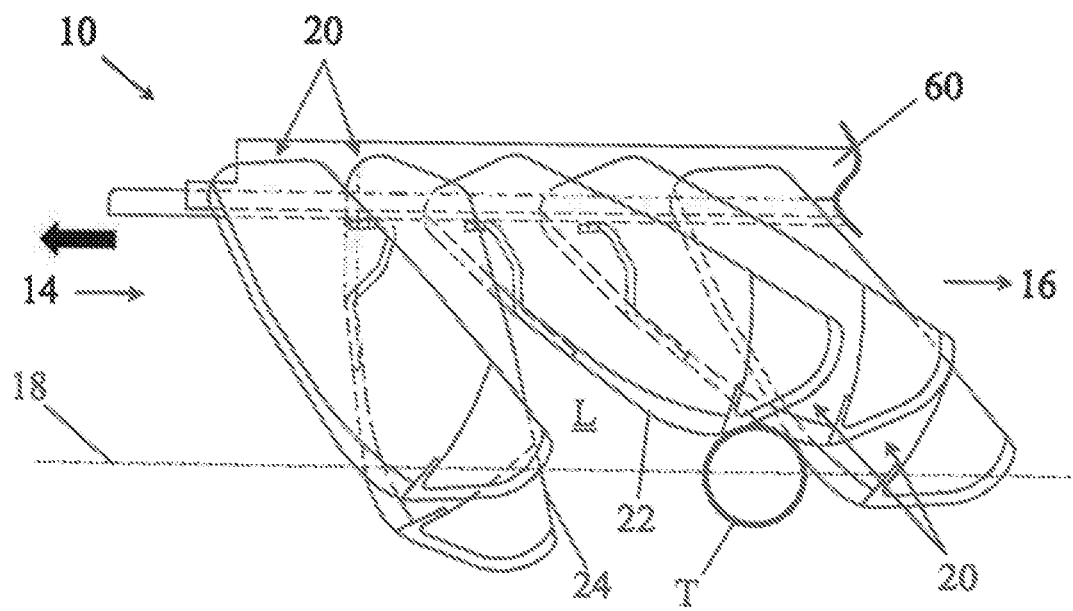

FIG. 10B of the device without hindrance illustrates the abrupt release of the second scale. It overshoots its resting position because of the inertia of its movement during the rapid return from the position deflected by the trunk towards the resting position.

A gap L forms at this moment between the rear edge 24 of the second scale and the front edge 22 of the third scale on the side of the trunk turned towards the intake 14 of the collector. Here again, there is a virtual absence of temporary overlap between these two scales.

Such a design of a deck of scales without hindrances generates successively significant temporary gaps L between each scale and the following scale, the gaps being susceptible of causing significant risks of loss of fruits during their harvest.

I claim:

1. A fruit collector apparatus comprising:
    an intake;
    an outlet;
    a plurality of rows of connected scales extending respectively between said intake and said outlet parallel to a median axis of the fruit collector, said plurality of rows of connected scales each having a succession of overlapped scales pivotally mounted on a support, each scale of the succession of overlapped scales having a proximal end turned toward the support and a free distal end opposite the proximal end, each scale of the succession of overlapped scales having a front edge turned toward said intake and a rear edge turned toward said outlet, the front edge and the rear edge extending respectively between the proximal end and the distal end, each scales of the succession of overlapped scales having a longitudinal median axis extending from the proximal end to the distal end and forming an acute angle of aperture with the median axis of the fruit collector relative to said intake while in a resting position, each scale of the succession of overlapped scales being pivotable relative to the support between the resting position and at least one bent-back position toward said outlet so as to reduce the angle of aperture; and
    at least one hinderance respectively cooperative with pairs of successive scales of the succession of overlapped scales so as to limit an amplitude of divergent displacement of a pivoting movement between the bent-back position and the resting position, wherein said at least one hinderance has a pair of conjugated stops that are complementally shaped, one of the pair of conjugated stops being attached to one scale of the pair of successive scales, another of the pair of conjugated stops attached to another scale of the pair of successive scales.

2. The fruit collector of claim 1, each scale of the succession of overlapped scales having a first stop on an upper fruit-collecting face and a second stop on a lower face opposite to the upper fruit-collecting face.

3. The fruit collector of claim 2, wherein the first stop has a catch protruding on the upper fruit-collecting face and the second stop has a depressed rim opening onto the lower face.

4. The fruit collector of claim 2, wherein each of the first stop and the second stop has a catch positioned at an equal distance from a rotational axis of the scale.

5. The fruit collector of claim 2, wherein the first stop and the second stop are positioned at an area of the scale extending between a scale fastening tab and a line perpendicular to a median axis of the scale and located in a plane of the scale halfway between the proximal end and the distal end of the scale.

6. The fruit collector of claim 2, wherein the first stop and the second stop are positioned at opposite sides of a plane perpendicular to the upper fruit-collecting face of the scale and passing through the median axis of the scale.

7. The fruit collector of claim 6, wherein the first stop is adjacent to the front edge of the scale and the second stop is adjacent to the rear edge of the scale.

8. The fruit collector of claim 1, wherein the amplitude of divergent displacement is no more than 30 degrees.

9. The fruit collector of claim 1, wherein an overlap occurs between, the front edge of one scale and the rear edge of a following scale in a direction toward said outlet, the front edge of the one scale being below the rear edge of the following scale.

10. The fruit collector of claim 1, wherein at least one of the front edges of the succession of overlapped scales and an edge of the distal end has a fruit-retaining relief.

11. The fruit collector of claim 1, wherein the free distal ends of the succession of overlapped scales overlap.

12. A harvesting machine having a fruit collector of claim 1 and further comprising:
   a shaking device positioned above the fruit collector.

13. A scale for a fruit collector comprising:
   an upper fruit-collecting face;
   a lower face opposite said upper fruit-collecting face;
   a proximal end;
   a distal end;
   a front edge linking said proximal end to said distal end;
   a rear edge opposite said front edge, said rear edge linking said proximal end to said distal end;
   a first stop positioned on said upper fruit-collecting face adjacent to said front edge; and
   a second stop positioned at said lower face adjacent said rear edge, said first stop protruding outwardly of said upper fruit-collecting face, said second stop protruding outwardly of said lower face.

14. The scale of claim 13, wherein either said front edge or an edge of said distal end has fruit-retaining relief distinct from said first stop.

15. The scale of claim 13, further comprising:
   a fastening tab securing the scale to a support, said fastening tab being of an elastic material.

* * * * *